Patented Feb. 10, 1942

2,272,645

UNITED STATES PATENT OFFICE 2,272,645

GEOCHEMICAL PROSPECTING

Esme E. Rosaire, Houston, Tex.

No Drawing. Application November 21, 1941,
Serial No. 419,911

5 Claims. (Cl. 23—232)

The present invention relates to prospecting for oil, gas and related deposits by earth sampling to determine the presence of hydrocarbons and other substances which leak or result from leakage from such deposits and which may serve as an indication of the proximity of the deposits.

It has been found that the fluids which leak from the deposits become adsorbed, absorbed, occluded or otherwise entrained in the soil through which they pass. An attempt to obtain directly therefrom traces of such gases as methane, ethane, hydrogen and other hydrocarbons higher than ethane results generally in a sample greatly diluted by atmospheric air.

An object of the present invention is to provide an improvement in the art of geochemical exploration by liberating from the soil, substances which are indicative of the location of valuable subsurface deposits.

It is also an object of the invention to utilize an acid in the treatment of soil to produce from the soil constituents sought as an indication of the location of hydrocarbon deposits.

Another object is to treat the soil to release in gaseous form the significant constituents which are in some form entrained therein.

A still further object is to apply acid to soil to assist in obtaining therefrom substances which are indicative of the proximity of valuable subsurface deposits.

In its broadest aspect the invention includes the step of treating soil with an acid capable of disintegrating the carbonates in the soil. Such action is instrumental in obtaining much richer samples of gases including significant constituents indicative of the location and extent of subterranean deposits.

In accordance with the invention it is believed at present that the acid treatment above mentioned breaks up oolites or similar bodies present in the soil. In some cases at least, oolites are now believed to be small particles created by shells formed about gas nuclei. See, for example, Science, January 13, 1939, page 27, Gas bubbles as nuclei for oolites. Hence, in accordance with this theory, oolites could serve as bottles for these gas inclusions which are liberated in practicing the invention. As the oolites so far examined have been found to be composed of calcium carbonate, the acid treatment breaks down the shell and releases the gas. While this theory is offered as an explanation of the manner of obtaining unexpected volumes of gases, it is to be understood that the invention is not limited or defined by such proposed theory.

A method embodying the invention consists in penetrating the top soil for a few feet with a bore hole. Suitable collection apparatus is arranged at the mouth of the bore hole to encompass the gaseous sample liberated within the bore hole. The bottom and/or adjacent wall of the bore hole are then subjected to the action of an acid to liberate from the soil a gaseous sample which is collected within the apparatus and which is subsequently analyzed to reveal the desired information.

Another and similar manner of practicing the invention includes the step of filling the bore hole with water to replace atmospheric air and air entrapped in the adjacent soil pores. Partial or subatmospheric pressure is then applied to the collecting apparatus to draw off underground air and entrapped soil gas which are normally discarded. An acid, preferably heavier than water, is then introduced at the bottom of the hole as by a tube extending through the water to the bottom of the hole. Such acid is instrumental in liberating from the soil a gaseous sample which, due to continuation of the subatmospheric pressure, is drawn off for collection and analysis.

The invention also contemplates a technique which includes the use of an inhibitor acid or an acid in solution with an inhibiting agent, some of the arsenates being suitable, so that the action of the acid is delayed for a predetermined period of time. In accordance with this modification the hole may be filled with the solution and the underground air and entrapped soil gas displaced before the liberating action on the soil occurs. Thus, the hole may be filled with the inhibited acid solution and partial or subatmospheric pressure applied to draw off the underground air displaced by the liquid. The air is discarded. When the action of the acid on the soil takes place, liberated gaseous constituents are collected in the manner above indicated.

It is believed obvious, both from a general knowledge of chemistry and from results obtained from experiments in carrying out the invention that any acid, organic or inorganic, can be used in the practice of this invention. It is preferable for obvious reasons to use an acid of which the calcium salt is soluble. It has been found generally preferable to use hydrochloric acid, but in agricultural areas where the resulting chlorides would be objectionable, field collected gas samples may be liberated by the use of nitric acid.

In general, the term "entrained" as used in the specification and claims is intended to include any gas particles which have been bottled, adsorbed, dissolved by or combined with the carbonate formations, and to distinguish from underground air and gas which is merely entrapped in the soil interstices.

This application is entitled to the filing date of copending application Serial No. 263,669, filed March 23, 1939, and entitled Geochemical prospecting. Said application was filed jointly by the present applicant and another, and subsequently reduced to a sole application by removing the present applicant and the herein claimed subject matter therefrom.

The invention claimed is:

1. In the method of exploration for petroliferous deposits, the steps of creating a shallow bore hole in the earth's surface, treating the soil within the hole with an acid capable of disintegrating components of the soil to evolve gases, applying a subatmospheric pressure to draw off and collect the evolved gases, and analyzing the collected gases for hydrocarbons and their derivatives.

2. The method of exploration for petroliferous deposits by the analysis of gaseous samples comprising the steps of creating a shallow bore hole in the earth, subjecting the soil near the bottom of the bore to contact with an acid, collecting a sample of the gas liberated by action of the acid with the soil, and analyzing the gaseous sample for the presence and amount of ethane.

3. The method of exploration for petroliferous deposits by the analysis of gaseous samples comprising the steps of creating a shallow bore hole in the earth, subjecting the soil near the bottom of the bore to contact with an acid, collecting a sample of the gas liberated by action of the acid with the soil, and analyzing the gaseous sample for the presence and amount of hydrocarbons and their derivatives whereby indications of the proximity to subterranean petroliferous deposits may be had.

4. The method of exploration for petroliferous deposits comprising producing a shallow bore hole in the earth, filling the hole with an inert liquid, applying partial pressure to the hole, withdrawing and discarding the gas displaced by the liquid, introducing an acid near the bottom of the hole, withdrawing and collecting the desorbed gas resulting from the action of the acid, and analyzing the collected gas for substances related to subterranean petroliferous deposits.

5. The method of exploration for petroliferous deposits comprising producing a shallow bore hole in the earth, introducing into such bore hole an inhibited acid, applying partial pressures to the bore hole, withdrawing and discarding the gas produced during the period of inhibition, withdrawing and collecting the gas evolved during the later period of acid action, and analyzing the collected gas for substances related to subterranean petroliferous deposits.

ESME E. ROSAIRE.